(12) United States Patent
Wurtenberger et al.

(10) Patent No.: US 8,437,292 B1
(45) Date of Patent: May 7, 2013

(54) METHOD OF CONTROLLING REVERSE LINK PACKET TRANSMISSION LATENCY BASED ON AIR-INTERFACE LOADING

(75) Inventors: Andrew Wurtenberger, Olathe, KS (US); Manasa Keshavachandra, Overland Park, KS (US); Caleb Hyde, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 496 days.

(21) Appl. No.: 12/481,033

(22) Filed: Jun. 9, 2009

(51) Int. Cl.
*H04L 23/02* (2006.01)

(52) U.S. Cl.
USPC .......................................... 370/329; 370/332

(58) Field of Classification Search .................. 370/235, 370/241–343; 455/522; 395/500; 375/259
See application file for complete search history.

(56) References Cited

U.S. PATENT DOCUMENTS

| | | | | |
|---|---|---|---|---|
| 5,734,867 A * | 3/1998 | Clanton et al. | ................. | 370/461 |
| 7,069,037 B2 | 6/2006 | Lott et al. | | |
| 7,215,653 B2 | 5/2007 | Kim et al. | | |
| 7,221,653 B2 | 5/2007 | Vanghi | | |
| 7,436,809 B2 * | 10/2008 | Harada et al. | .................. | 370/338 |
| 7,466,682 B1 * | 12/2008 | Ribas et al. | .................... | 370/342 |
| 7,471,654 B2 * | 12/2008 | Mueckenheim et al. | ..... | 370/329 |
| 7,496,067 B2 * | 2/2009 | Qiu et al. | ....................... | 370/329 |
| 7,561,893 B2 * | 7/2009 | Moulsley et al. | ............. | 455/522 |
| 7,751,370 B2 * | 7/2010 | Tiedemann et al. | .......... | 370/335 |
| 8,179,876 B2 * | 5/2012 | Agrawal et al. | ................ | 370/343 |
| 2005/0014524 A1 * | 1/2005 | Lott et al. | ...................... | 455/522 |
| 2005/0265236 A1 | 12/2005 | Kwon et al. | | |
| 2005/0286422 A1 * | 12/2005 | Funato | ........................... | 370/235 |
| 2006/0135193 A1 * | 6/2006 | Ratasuk et al. | ............... | 455/522 |
| 2006/0209970 A1 * | 9/2006 | Kanterakis | ..................... | 375/259 |
| 2007/0030839 A1 * | 2/2007 | Vimpari et al. | ............... | 370/342 |
| 2007/0142074 A1 * | 6/2007 | Black et al. | .................... | 455/522 |
| 2007/0147331 A1 | 6/2007 | Bi et al. | | |
| 2007/0173278 A1 * | 7/2007 | Yoon et al. | ..................... | 455/522 |
| 2008/0057969 A1 * | 3/2008 | Agami et al. | .................. | 455/450 |
| 2008/0080465 A1 * | 4/2008 | Pajukoski et al. | ............. | 370/342 |
| 2008/0084841 A1 * | 4/2008 | Kim et al. | ...................... | 370/329 |
| 2008/0137614 A1 | 6/2008 | Kwon et al. | | |
| 2010/0227638 A1 * | 9/2010 | Park et al. | ...................... | 455/522 |

OTHER PUBLICATIONS

Agilent Technologies, "Power Parameters Info", Nov. 10, 2006, available at http://wireless.agilent.com/rfcomms/refdocs/1xevdo/1xevdo_gen_rev_t2p_parms.php (last visited Jun. 9, 2009).

Y. Iida et al., "1xEV-DO Revision a System to Realize Wireless Broadband Communications", Dec. 2007, pp. 145-149, Hitachi Review, vol. 56, avaliable at:http://www.hitachi.com/ICSFiles/afieldfile/2007/12/20/r2007_dec_007.pdf (last visited Jun. 9, 2009).

(Continued)

*Primary Examiner* — Jeffrey M Rutkowski
*Assistant Examiner* — Syed M Bokhari (57) ABSTRACT

Methods and apparatus for transmitting communications using a radio frequency (RF) communication channel are provided. A network condition and/or a usage level of the RF communication channel are determined. A designated duration is selected based, at least in part, on the network condition and/or usage level. A time period for transmitting a communication in the RF channel is selected such that the time period has a duration corresponding to the designated duration. A transmission in the RF communication channel is initiated during the time period. The designated duration may be adjusted based on further observations of network conditions and/or usage levels.

19 Claims, 4 Drawing Sheets

OTHER PUBLICATIONS

Third Generation Partnership Project 2 (3GPP2), "cdma2000 High Rate Packet Data Air Interface Specification", 3GPP2 C.S00024-A v. 3.0, Section 10.11, Sep. 2006, available at http://www.3gpp2.org/public_html/specs/C.S0024-A_v3.0_060912.pdf (last visited Jun. 9, 2009).

M. Gandhi et al., U.S. Appl. No. 11/073,556, filed Mar. 7, 2005.

* cited by examiner

METHOD OF CONTROLLING REVERSE LINK PACKET TRANSMISSION LATENCY BASED ON AIR-INTERFACE LOADING

BACKGROUND

Many people use mobile stations, such as cell phones and personal digital assistants, to communicate with cellular wireless networks, which typically provide communication services such as voice, text messaging, and packet-data communication. These mobile stations and networks typically communicate with each other over a radio frequency (RF) air interface according to a wireless protocol such as Code Division Multiple Access (CDMA), perhaps in conformance with one or more industry specifications such as IS-95, IS-856, and IS-2000. Other protocols may be used as well, such as iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and others now known or later developed.

Mobile stations typically conduct wireless communications with one or more base transceiver stations (BTSs), each of which are arranged to send communications to and receive communications from mobile stations over the RF air interface. Each BTS is in turn communicatively connected with a network entity known as a base station controller (BSC) (sometimes referred to as a radio network controller (RNC)), which controls one or more BTSs and acts as a conduit between the one or more BTSs and one or more switches or gateways, such as a mobile switching center (MSC) and/or a packet data serving node (PDSN).

To access data networks, such as the Internet or a corporate local-area network (LAN), the mobile stations or "access terminals" and cellular wireless networks or "access networks" may communicate over an air-interface based on the requirements of an Evolution-Data Optimized (EV-DO) standard. In particular, the access terminals and the access network may communicate based on the requirements in Third Generation Partnership Project 2 (3GPP2), "cdma2000 High Rate Packet Data Air Interface Specification", 3GPP2 C.S00024-A v. 3.0, September 2006 ("the EV-DO Rev. A Standard"), which is incorporated herein by reference for all purposes. Transmissions from the access network to the access terminal occur over a "forward channel" or "forward link" and transmissions from the access terminal to the access network occur over a "reverse channel" or "reverse link". Transmissions between the access terminal and the access network may be divided into "frames". Frames in turn may be made up of "slots" (a.k.a. time slots). For example, the EV-DO Rev. A Standard defines a "slot" to be 1.66 . . . ms and a frame to be 16 slots, which equals 26.66 . . . ms. EV-DO Rev. A Standard, §1.11.

OVERVIEW

A first exemplary embodiment is a method. A condition of a radio frequency (RF) communication channel is determined. A designated duration is selected based, at least in part, on the condition. A time period for transmitting a communication in the RF channel is selected such that the time period has a duration corresponding to the designated duration. A transmission in the RF communication channel is initiated during the time period.

A second exemplary embodiment is a method. A first usage level of a radio frequency (RF) communication channel is determined. A designated duration is selected based, at least in part, on the first usage level. A first communication in the RF channel during a first time period is transmitted where the first time period has a duration corresponding to the designated duration. A second usage level of the RF communication channel is determined. The designated duration is adjusted based, at least in part, on the second usage level. A second communication in the RF channel during a second time period is transmitted, where the second time period has a duration corresponding to the adjusted designated duration.

A third exemplary embodiment is a wireless device. The wireless device includes a transceiver, a processor and data storage. The data storage is configured to store program instructions that can be executed by the processor to perform functions. The functions include: (a) determining a condition of a radio frequency (RF) communication channel, (b) selecting a designated duration, based at least in part, on the condition, (c) selecting a time period for transmitting a communication in the RF communication channel, such that the time period has a duration corresponding to the designated duration, and (d) using the transceiver, initiating a transmission of the communication in the RF communication channel during said time period.

BRIEF DESCRIPTION OF THE DRAWINGS

Various examples of embodiments are described herein with reference to the following drawings, wherein like numerals denote like entities, in which.

DETAILED DESCRIPTION

1. Introduction

Different network applications may use different transmission strategies when communicating over a wireless communication protocol, such as EV-DO Rev. A. For example, certain applications may be relatively sensitive to "latency" or delay in transmitting communications through the communication network. Such "low-latency" applications may include, for example, voice calls and real-time streaming video. Other applications may be less sensitive to latency, but may use "high-capacity" transmission strategies to transfer large amounts of data. Such "high-capacity" applications may include, for example, e-mail, file transfers (e.g., uploading or downloading data via the File Transfer Protocol (FTP)), and many World Wide Web (WWW) applications. Thus, it may be beneficial to provide a "high-capacity" transmission mode for certain applications and a "low-latency" transmission mode for other applications.

In transmitting data between an access terminal, such as a cellular phone, and a network entity through the communication network, the access terminal may be connected via an air interface to a base transceiver station (BTS). For data transmissions according to the EV-DO Rev. A Standard, the access terminal is allocated one or more specific frames to transmit data; e.g., on a per-application basis. For example, suppose an access terminal is operating two applications simultaneously: a video-conferencing session and a WWW session. Each of the two applications for that access terminal may have a different set of frames allocated for use by the application. Additionally, each application may have a different transmission mode: the video-conferencing session may use a low-latency transmission mode and the WWW session may use a high-capacity transmission mode.

The EV-DO Rev. A Standard discusses the use of high-capacity and low-latency transmission modes. See EV-DO Rev. A Standard, §10.11.6.1.6.1, pp. 10-230 to 10-233. As indicated above, EV-DO Rev. A considers a frame of 26.66 . . . ms to be divided into four sub-frames, each sub-frame taking 6.66 . . . ms. EV-DO Rev. A Standard, §1.11. Each of the high-capacity and low-latency transmission modes has a "termination target" or number of sub-frames that an application intends to use to transmit data during a particular frame. If a fixed amount of data is transmitted during a frame, a reduction in the number of sub-frames (or time) of the frame used to transmit the fixed amount of data decreases the latency for the fixed amount of data as well as increasing the "effective data rate" or number of bits of data per unit time. As examples, Table 10.11.6.1.6.1-1 of the EV-DO Rev. A Standard indicates that the effective data rate for a maximum amount of data or "payload" of 96 bits to be transmitted during 4 sub-frames is 4.8 kilobits per second, but if the same 96 bit payload is transferred during one sub-frame, the effective data rate is 19.2 kilobits per second.

In EV-DO Rev. A, LoLatTerminationTargetPS defines the termination targets for low-latency transmission modes and HiCapTerminationTargetPS defines the termination targets for low-latency transmission modes, where PS indicates a maximum packet size (e.g., LoLatTerminationTarget128 is a low-latency termination target for a packet whose maximum size is 128 bits). EV-DO Rev. A Standard, §10.11.6.1.6.1, p. 10-282 and 10-283. The termination targets are set by an access network serving an access terminal. See EV-DO Rev. A Standard, §§10.11.6.1.6.2, pp. 10-248 and 10-249. Once set, the termination targets are used by access terminals communicating via the communication network. See EV-DO Rev. A Standard, §§10.11.6.1.6.1.1, 10.11.6.1.6.1.2, pp 10-244, 10-246, and 10-247.

In contrast to the statically defined termination targets, the exemplary embodiment described herein may adjust the high-capacity and low-latency termination targets dynamically. For example, the termination targets may be adjusted based on one or more network conditions affecting part or all of the communication network, such conditions may include, without limitation, an amount of bandwidth used in a given portion (e.g., a sector) of the communication network, a number of active application sessions, information about external events (e.g., emergency conditions), power or other requirements of network equipment, erroneous event counts (e.g., numbers of dropped calls or lost packets) and/or equipment conditions/failures.

Termination targets may be adjusted periodically as well. In an exemplary embodiment, network conditions may be observed periodically and, based on one or more observations, termination target(s) may be updated. For example, the communication network or access terminal may observe a signal-to-noise ratio on a reverse link every millisecond and, based on the observed signal-to-noise ratio, adjust termination targets every millisecond. As another example, the communication network may determine a reverse noise rise on a per sector or per base station basis. The reverse noise rise is a determination an amount of non-signal activity (a.k.a. noise) on all reverse channels served in the measured sector or by the measured base station.

Additionally or instead, termination targets may be adjusted based on usage rates. The usage rates may be determined by observations of activity on a reverse link by an access terminal. One measure of the activity on a reverse link is a reverse activity bit (RAB), such as Quick Reverse Activity Bits (QRABs) and Filtered Reverse Activity Bits (FRABs). Reverse activity bits may be sent by the communication network to the access terminal as an indication of activity on the reverse link; e.g., a reverse activity bit set to "1" may indicate to the access terminal that the reverse link is busy at a given time (e.g., above a reverse-noise-rise threshold) and a setting of "0" may indicate the reverse link is not active above the reverse-noise-rise threshold, and perhaps idle. The access terminal may then use the reverse activity bits to determine the usage and usage rates of the link.

Other usage rates may be determined by an application, an application type (e.g., WWW sessions or voice sessions), an access terminal, and/or a given subscriber of the communication network. Some example usage rates are a number of messages per unit time (e.g., 100 messages per hour or 20 text messages per month), an amount of data per unit time (e.g., a number of megabits per day), and a number of sessions per unit time (e.g., a number of WWW sessions or connections to the Internet per month). Many other network conditions and usage rates are possible as well.

Historical observations may be taken into account as well, such as adjusting termination targets based on an average of a current observation(s) of network conditions and/or usage rates and one or more stored past observations of network conditions and/or usage rates. For example, a simple or weighted average of reverse noise rises taken over an amount of time may be used to adjust termination targets. As another example, a simple or weighted average of usage rates of a subscriber taken over an amount of time may be used in adjusting termination targets. Other techniques and measurements for adjusting termination targets are possible as well.

The termination target may be specified as a number of sub-frames. For example, in EV-DO Rev. A, a frame is divided into four sub-frames. A given termination target may then be specified as an integral number of sub-frames between one and four. Similarly, the termination target may be specified as a number of time slots per frame, such as an integral number between one and sixteen. Further, the termination target may be specified as a duration. For example, assuming a 26.666 . . . ms frame, the termination target within that frame may be specified as a duration value between 0 and 26.666 . . . milliseconds.

To aid determination of termination targets, the access network and/or the access terminal may have a mapping of application types to transmission modes (and thus termination targets). An example mapping is shown in Table 1 below.

TABLE 1

| Application | Transmission Mode |
|---|---|
| File Transfer Protocol | High Capacity |
| Hyper Text Transfer Protocol | High Capacity |
| Voice | Low Latency |
| Streaming Video | Low Latency |
| . . . | . . . |

For example, suppose an access terminal starts a file transfer application. The access terminal may then use the mapping to determine that the "high capacity" transmission mode is to be used. Then, the termination target for the file transfer application may be determined based on the transmission mode. Note that the transmission mode may also take a packet size into account; e.g., if 1024 bit packets with the high-capacity transmission mode, the specific termination target for this example may be HiCapTerminationTarget1024. Other such mappings are possible as well.

In an exemplary embodiment, the communication network may permit negotiation of termination targets. The access terminal may be able to adjust a given termination target or targets based on observations of network conditions by the access terminal (e.g., signal to noise ratio) and/or in accordance with usage rates measured by the access terminal. As part of the negotiation, the communication network may set limits on a given termination target (e.g., a high-capacity termination target must be between a minimum number of sub-frames and a maximum number of sub-frames). The communication network may establish a minimum duration between termination target updates by the access terminal. For example, the communication network may instruct the access terminal to update a low-latency termination target no more frequently than once per 100 milliseconds.

The communication network may also re-negotiate termination targets. For example, after negotiation of termination targets, the communication network may reset the termination targets for the access terminal. In other scenarios, the communication network may allow the access terminal to adjust termination targets after renegotiation. For example, suppose the communication network initially permits the access terminal to negotiate a high-capacity termination target between two and four sub-frames. At some later time, a network condition occurs, such as a load spike, causing the communication network to renegotiate the high-capacity termination target and fix the high-capacity termination target at four sub-frames. After the load spike abates, the communication network may then inform the access terminal that negotiation of the high-capacity termination target is permitted again, perhaps between two and four sub-frames again or perhaps using new minimum and maximum numbers of sub-frames (e.g., between three and four sub-frames).

The communication network may be configured to generally operate in one of two modes. In a "flexible" mode, each access terminal may individually negotiate and adjust termination targets with an associated base station. In a "controlled" mode, the base station may specify termination targets for all access terminal served in one or more sectors. The base station may determine the mode (either flexible or controlled) based on network conditions, such as sector-wide, base-station-wide and/or network-wide traffic loads, reverse noise rise levels, signal-to-noise ratios, and/or other network conditions. In some embodiments, a network manager, which may be computer hardware and/or software configured to control the communication network, may specify the mode, which the base station may then indicate to access terminals communicating with the base station. The functionality of the network manager may be included with the base station or may be resident in a separate device or devices configured to communicate with the base station.

By setting termination targets by negotiation and also taking network conditions into account instead of using fixed values for the termination targets, a communication network may be able to dynamically and automatically adjust transmission targets and thus data rates. Then, the communication network may negotiate possibly different termination targets for each access terminal based on a variety of variables, such as but not limited to network conditions (e.g., per-sector conditions), subscriber type, usage rates, and/or other variables. Further, an access terminal may negotiate access-terminal-specific termination targets as well, perhaps leading to better performance of applications on the access terminal that employ the termination targets. Thus, the communication network may provide better service and rapidly adapt to changing conditions outside of the network by changing termination targets accordingly, such as but not limited to time-of-day traffic patterns, emergencies or events concentrated in one or a few sectors of the network), and/or air-interface quality issues.

2. An Example Communication System

Referring to the drawings, as noted above, FIG. 1 is a simplified block diagram of an example communication system 100. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

Figure 1:
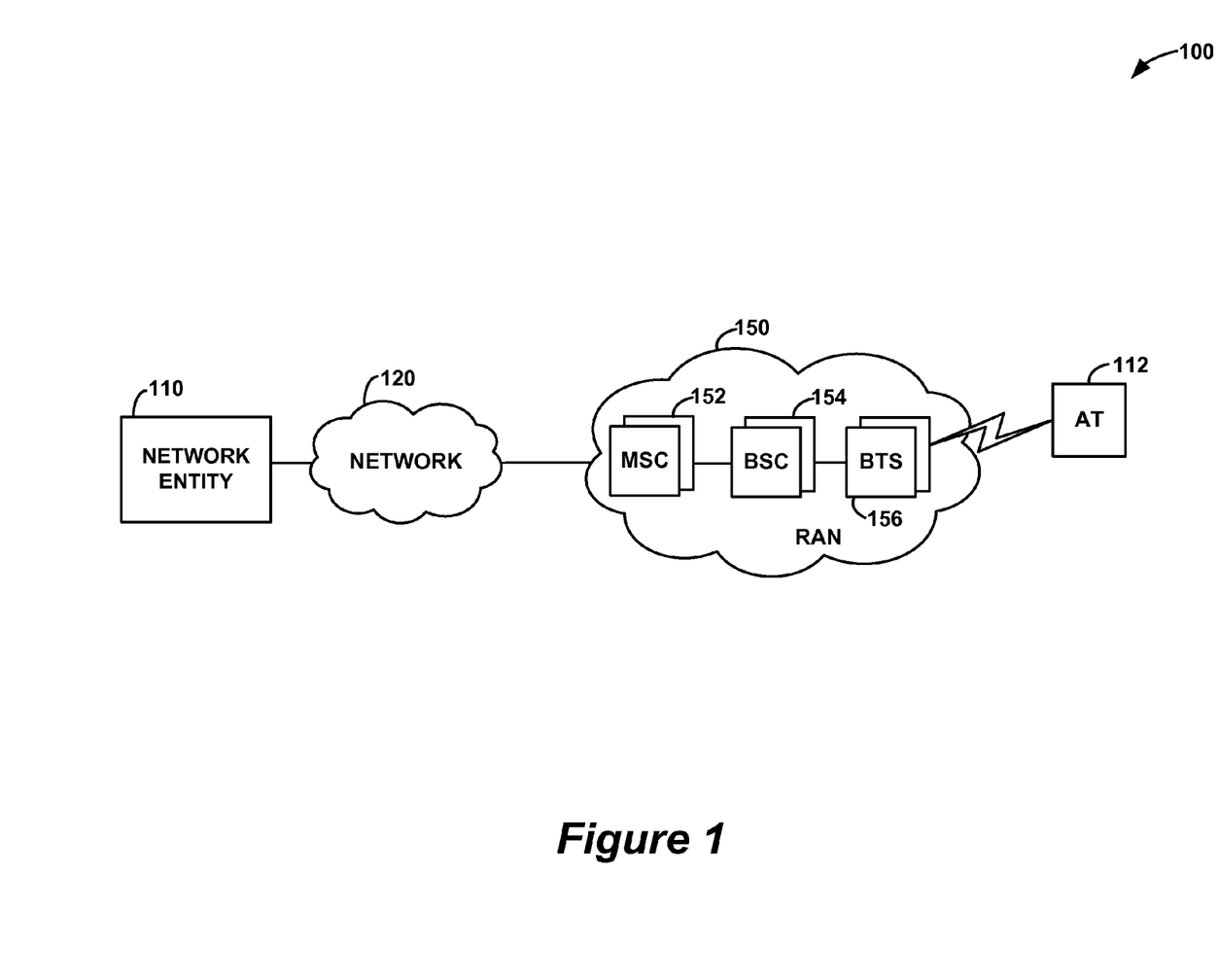
FIG. 1 is a simplified block diagram of a communication system, in accordance with an exemplary embodiment.

As shown in FIG. 1, the communication system 100 includes a representative network entity 110 in communication with a representative access terminal (AT) 112. Situated between the network entity 110 and the access terminal 112 is a representative communication path including a network 120 and a radio access network (RAN) 150. In practice with this arrangement, when the network entity 110 sends a message destined for the access terminal 112, the message will pass via network 120, via RAN 150 and over an air interface to the access terminal 112. Note that additional entities not depicted in FIG. 1 could be present as well. As an example, there could be more than one access terminal in communication with network 120; furthermore, there could be additional WCDs in communication with network entity 110. There could be one or more devices and/or networks making up at least part of one or more of the communication links depicted in FIG. 1. As an example, there could be one or more routers, switches, or other devices or networks on the link between network entity 110 and network 120. Additionally, the herein-described functionalities of network 120 and RAN 150 may be combined into one network.

To carry out these functions, the network entity 110 and the access terminal 112 may take the form of a computing/communication device, such as a cell phone, personal digital assistant, wirelessly equipped personal computer, personal computer, application server, or other entity now known or later developed configurable to carry out the herein-described functionality of the respective communication-origination device or WCD. For example, the access terminal 112 may be an EV-DO Rev. A compatible mobile device and the network entity 110 may be a server configured to provide web pages, e-mail, audio data, video data, binary data, and/or other types of information to the access terminal 112.

In FIG. 1, the network entity 110 is shown coupled with network 120, which in turn connects with RAN 150. Network 120 may be the Internet or may comprise some other public or private packet-switched and/or circuit-switched network. Network 120 could include any number of gateways, routers, proxies, and other intervening elements and may include one or more of the elements of the RAN 150 described below.

The access terminal 112 may likewise take various forms, examples of which include the computing/communication devices listed above. The access terminal 112 and/or network entity 110 may be further programmed with a plurality of applications, each of which serves a discrete device function that may or may not involve user interaction. Examples of such applications include, without limitation, voice processing, image processing, word processing, phone book, calendar, spreadsheet, games, audio player, video player, web browser, image management, graphics editing, utilities, and other applications now known or later developed. Access terminal 112 may have a wireless-communication interface comprising an antenna and a chipset for communicating with one or more access nodes over an air interface. As an example, the chipset could be one suitable for engaging in communications based on an EV-DO standard, such as the EV-DO Rev. A Standard.

The RAN 150 may include one or more mobile switching centers (MSCs) 152, one or more base station controllers (BSCs) 154, and one or more base transceiver stations (BTSs) 156. MSC 152 may enable communications between RAN 150 and one or more networks, such as the network 120 and/or the public switched telephone network (PSTN). BSC 154 may control BTS 156 and provide connections between BTS 156 and other network entities, including but not limited to MSC 152. BTS 156 may facilitate, establish, and/or control air-interface communication sessions (e.g., voice calls and data sessions) between one or more access terminals, such as access terminal and one or more networks, such as the RAN 150. BTS 156 and access terminal 112 may communicate over an air interface according to a wireless communication protocol, such as the EV-DO Rev. A Standard.

3. An Example Computing Device

Figure 2:
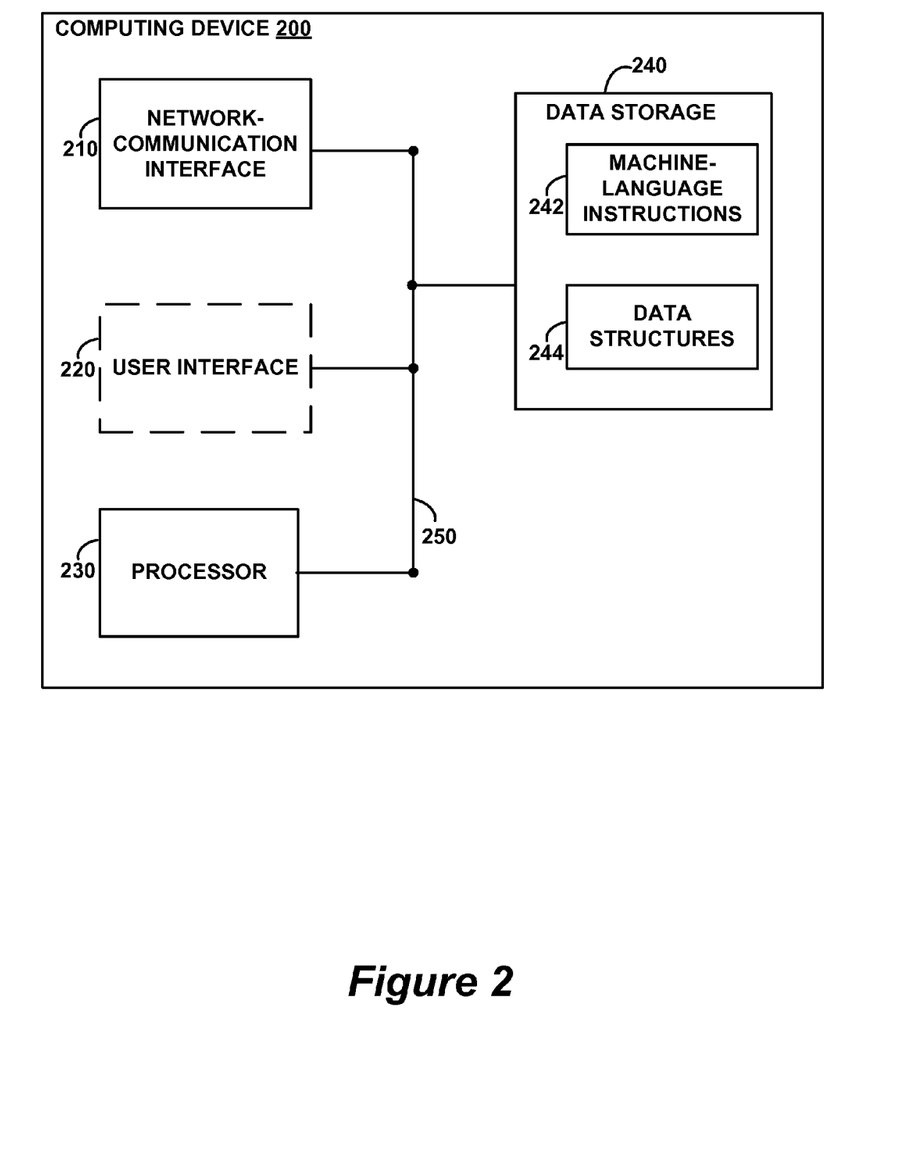
FIG. 2 is a simplified block diagram of a computing device, in accordance with an exemplary embodiment.

Turning briefly to FIG. 2, a simplified block diagram depicting functional components of an example computing device 200 is provided. The computing device 200 may be used as a herein-described network entity, a server, a communication-origination device, and/or as a WCD, among other possibilities. As shown in FIG. 2, the computing device 200 a network-communication interface 210, a user interface 220, a processor 230, and data storage 240, all of which are coupled together by a system bus or other connection mechanism 250.

Network-communication interface 210 may comprise a wireless-communication interface. The wireless-communication interface may include cellular wireless chipset of the type arranged to engage in air interface communication with RAN 150 according to an agreed air interface protocol, such as such as CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, and/or others now known or later developed. As an example, the cellular wireless chipset could be one suitable for engaging in EV-DO communications.

Further, the network-communication interface 210 preferably includes one or more antennas (not shown) to facilitate air-interface communication. The network-communication interface 210 may comprise, instead or as well, a wired-communication interface. The wired-communication interface, if present, may comprise a wire, cable, fiber-optic link or similar physical connection to a wide area network (WAN), a local area network (LAN), one or more public data networks, such as the Internet, one or more private data networks, or any combination of such networks.

User interface 220 provides a mechanism through which a user can interact with the computing device. The user interface 220 may include input components such as a keypad, keyboard, a microphone, a camera, and/or a touch-sensitive screen, and output components such as a display screen and loudspeaker. The user interface 220 also preferably includes analog-digital conversion circuitry and underlying control logic for interfacing with a user, such as but not limited to prompting and receiving user input for addresses and/or content, converting digital content to a presentable analog form, and receiving analog content and converting it to digital form for transmission or other processing. FIG. 2 shows the user interface 220 with dashed lines to indicate that the user interface 200 is an optional interface to the computing device 200.

Processor 230 may comprise one or more general-purpose processors and/or one or more specialized processors (e.g., digital signal processors and/or application specific integrated circuits). Data storage 240, in turn, may comprise one or more volatile and/or non-volatile storage components, such as magnetic, optical, electronic, or organic storage, and may be integrated in whole or in part with processor 230.

Figure 3:
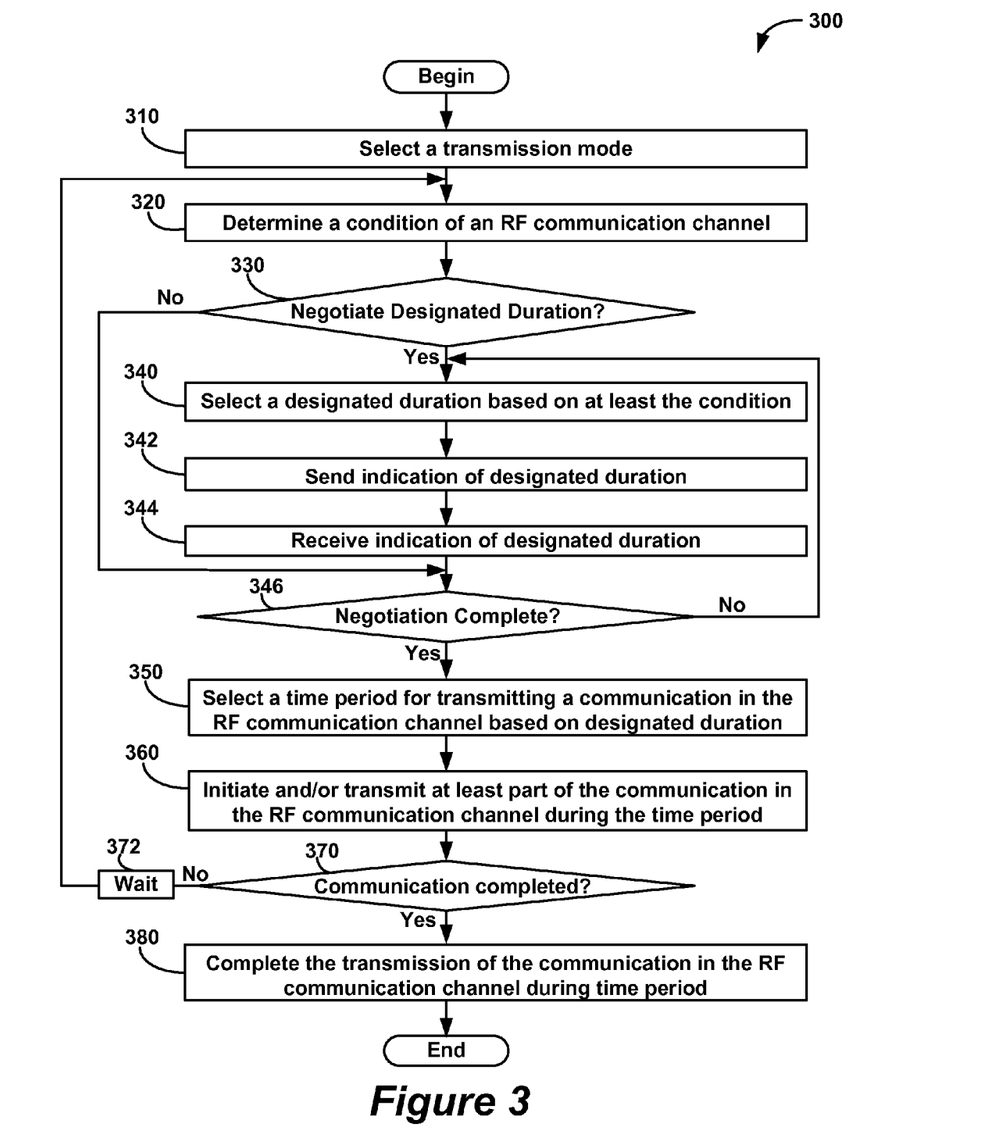
FIG. 3 is a flowchart depicting a method in accordance with an exemplary embodiment.
Figure 4:
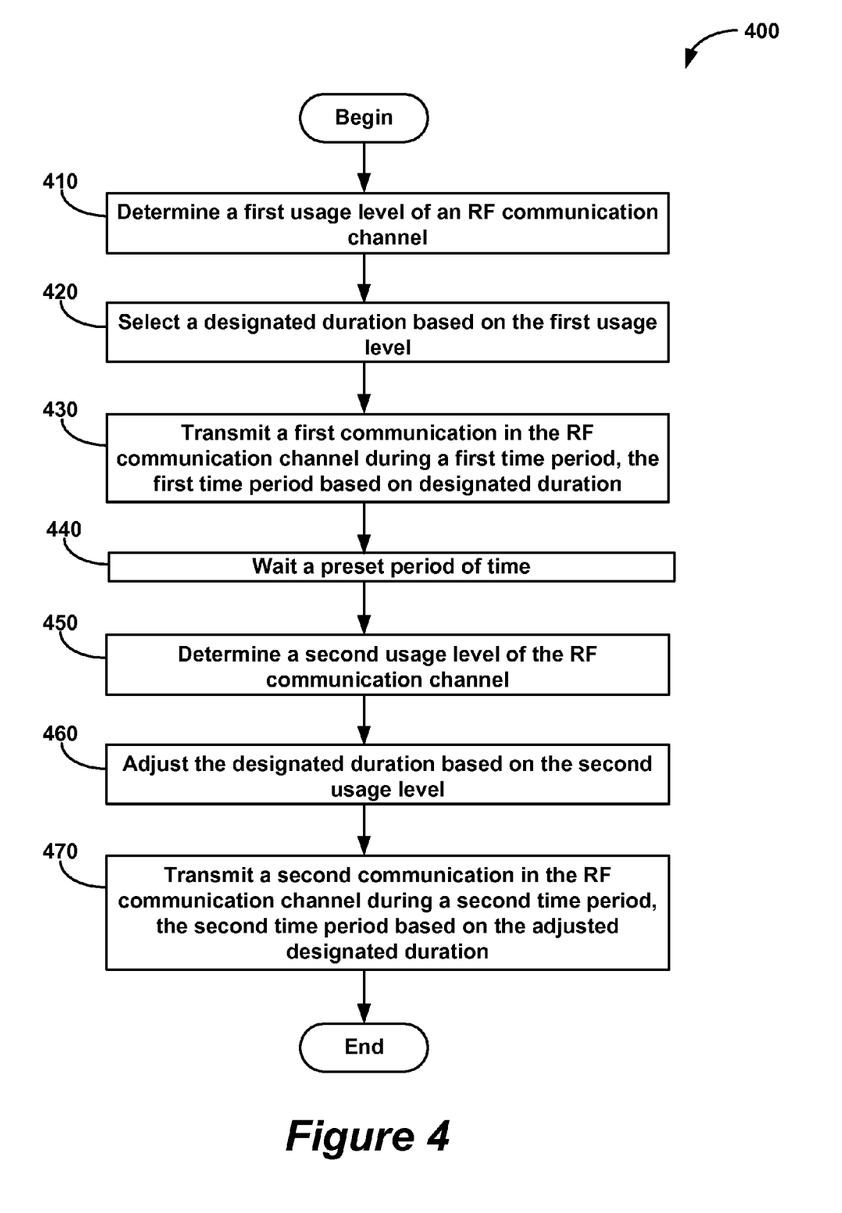
FIG. 4 is a flowchart depicting a method in accordance with an exemplary embodiment.

In the exemplary embodiment, as shown, data storage 240 contains machine-language instructions 242 (i.e., program modules) as noted above, which are preferably executable by processor 230 to carry out particular device functions. Further, the data storage 240 may contain data structures 244 to carry out the herein-described functions, techniques, and procedures, such as, but not limited to, address lists, message identifiers, and/or content storage locations (e.g., buffers). In particular, the machine-language instructions 242 and the data structures 244 may be stored in a tangible computer-readable medium (such as data storage 240) and, may enable the processor 230 to carry out the some or all procedures described below with respect to methods 300 and 400.

4. An Example Method for Completing Transmissions in an RF Communication Channel FIG. 3 depicts a flowchart of a method, in accordance with an exemplary embodiment. In particular, FIG. 3 depicts a method 300 for completing transmission in an RF communication channel. Each block of the method 300 is further explained below.

It should be understood that each block in this flowchart and within other flowcharts presented herein may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

Method 300 and/or method 400 (described below with respect to FIG. 4) may be carried out on a network entity 110, an access terminal 112, a BSC 154, a BTS 156, one or more other entities described herein, and/or one or more other entities now known or later developed that are not described herein, without departing from the scope and spirit of the present invention. In some embodiments, part or all of method 300 and/or method 400 may be carried out by an access terminal 112 configured as an EV-DO access terminal, which may operate in partial or complete compliance with the EV-DO Rev. A Standard, to access RAN 150. In other embodiments, part or all of method 300 and/or method 400 may be carried out by a base station, such as BTS 156, configured to operate in partial or complete compliance with the EV-DO Rev. A Standard.

Method 300 may begin at block 310. At block 310, a transmission mode may be selected by an access terminal or a communication network. The access terminal may be in communication with the communication network. For example, the access terminal may communicate with (and be served by) a base station of the communication network using procedures in partial or complete compliance with the EV-DO Rev. A Standard.

The transmission mode may be selected between multiple transmission modes, such as a high-capacity mode, a low-latency mode, and/or other transmission mode(s). The transmission mode may be selected as a "hard-coded" value by the access terminal or communication network. The transmission mode may be selected on a per-application basis, perhaps by use of a mapping of application types to transmission modes described above. The transmission mode may be selected by user input, such as by selecting the transmission mode at user interface of an access terminal. The transmission mode may be determined as part of a negotiation between the access terminal and the communication network.

At block 320, a condition of an RF communication channel may be determined. The condition may be determined based on observation of a reverse noise rise, a reverse activity bit, by a status of an access terminal (e.g., busy or idle), or another observation.

At block 330, a determination may be made whether a designated duration is to be negotiated. The designated duration may be specified in terms of a number of units, such as a number of milliseconds or as a number of sub-frames. The designated duration may be a termination target as described above.

If the designated duration is to be negotiated, method 300 may proceed to block 340. If the designated duration is not to be negotiated, method 300 may proceed to block 350.

At block 340, a designated duration may be selected. The designated duration may be selected based at least on the condition determined at block 340 and/or the transmission mode discussed with respect to block 310.

At block 342, an indication of the designated duration may be sent. Either the access terminal or the communication network (e.g., a base station serving the access terminal) may send the indication of the designated duration.

At block 344, an indication of the designated duration may be received.

At block 346, a determination may be made whether negotiation of the designated duration is complete. If the negotiation is complete, method 300 may proceed to block 350. If the negotiation is not complete, method 300 may proceed to block 340.

For example, the base station serving an access terminal may select an initially-designated duration (e.g., 3 sub-frames) and send an indication of the initially-designated duration to the access terminal. The access terminal may receive the indication and set a designated duration for the access terminal based on the initially-designated duration in the indication. The designated duration may be for all transmission modes or may be transmission-mode specific. The indication may be sent by the base station when a value of an observed network condition, such as reverse noise rise (RNR), exceeds a threshold (e.g., the reverse-noise-rise threshold).

In this example, the access terminal may accept the initially-designated duration as the designated duration either explicitly or tacitly. An explicit response from the access terminal would be an acknowledgement message or other indication of acceptance of the designated duration. A tacit response from the access terminal may be determined by the base station based on not receiving an indication from the access terminal within a predetermined period of time for a response.

For example, suppose a base station sends an indication of an initially-designated duration of 20 milliseconds to an access terminal and that the predetermined amount of time is 500 milliseconds. Then, the base station would wait 500 milliseconds to receive a response from the access terminal. If no response has been received by the base station during the 500 milliseconds, the base station would determine the access terminal had tacitly responded and accepted the initially-designated duration of 20 milliseconds as the designated duration for the access terminal.

In other embodiments, the roles of the access terminal and the base station in this example may be reversed (e.g., the access terminal may send the indication of an initially-designated duration and the base station may receive/acknowledge the indication of the initially-designated duration).

As another example response, the access terminal may attempt to negotiate an adjusted-designated duration by sending an indication of the adjusted-designated duration, which may differ from the initially-designated duration, to the base station. The base station may either accept the indicated adjusted-designated duration, either explicitly or tacitly as described above or continue to negotiate with the access terminal.

The negotiation may be complete when a designated duration is accepted. In some embodiments, the base station may respond with a message explicitly ending the negotiation and setting the designated duration.

At block 350, a time period for transmitting a communication in the RF communication channel may be determined. The time period may be determined based on the designated duration. The time period may be expressed as an amount of time (e.g., 3 milliseconds), as a number of sub-frames, or according to some other measurement.

At block 360, at least part of a communication may be transmitted (that is, initiated, continued, and/or completed) in the RF communication channel during the time period. According to the EV-DO Rev. A Standard, the transmission may take place over a number of determined sub-frames as specified by the designated duration. Typically, the number of sub-frames is an integer between one and four, as one sub-frame is the minimum amount of time allowed to transmit data under the EV-DO Rev. A Standard, and four sub-frames is equivalent to an entire frame. As transmission durations are allocated on a frame-by-frame basis in EV-DO Rev. A, four sub-frames is a maximum number of sub-frames that can allocated to transmit within a frame. Other transmission schemes are possible as well.

At block 370, a determination is made whether the communication is completed. If the communication is completed, method 300 proceeds to block 380. If the communication is not completed, method 300 proceeds to block 372.

At block 372, method 300 may wait for a preset period of time. The preset period of time may be determined based on a minimum amount of time for network conditions to change, such a number between one and five milliseconds. After the waiting period is completed, method 300 may proceed to block 320.

At block 380, method 300 may complete the transmission.

After completing the procedures of block 380, method 300 may end.

5. An Example Method for Transmitting Communications in an RF Communication Channel FIG. 4 depicts a flowchart of a method, in accordance with an exemplary embodiment. In particular, FIG. 4 depicts a method 400 for sending content to addresses in an address list. Each block of the method 400 is further explained below.

Method 400 may begin at block 410. At block 410, a first usage level of an RF communication channel may be determined. The RF communication channel may enable communication between an access terminal and a communication network. For example, the access terminal may communicate with (and be served by) a base station of the communication network using procedures partially or completely in compliance with the EV-DO Rev. A Standard.

The first usage level may be determined based on reverse activity bits, on a per application basis, on a per application type basis, on a per access terminal basis and/or on a per subscriber basis as described above. Historical observations may be taken into account as described above as well.

At block 420, a designated duration may be selected based on the first usage level. The designated duration may be a termination target as described above. The designated duration may be specified in terms of a number of units, such as a number of milliseconds or as a number of sub-frames.

At block 430, a first communication may be transmitted in the RF communication channel during a first time period. The first time period may be determined based on the designated duration as described above with respect to block 350 of FIG. 3.

At block 440, method 400 may wait for a preset period of time, such as described above with respect to block 372 of FIG. 3.

At block 450, a second usage level of the RF communication channel may be determined. The second usage level may be determined as described above with respect to the first usage level of block 410.

At block 460, the designated duration may be adjusted based on the second usage level. The designated duration may be specified in terms of the units described above with respect to block 420. The adjustment of the designated duration may take place in fixed increments, such as an adjustment increasing or decreasing the designated duration by one sub-frame. In other embodiments, the adjustment may take place in variable increments.

The adjustment may be limited based on minimum and/or maximum values set for the designated duration. For example, the adjustment to the designated duration may be bounded below by a minimum designated duration of one sub-frame and may be bounded above by a maximum designated duration of four sub-frames.

At block 470, a second communication may be transmitted in the RF communication channel during a second time period. The second time period may be determined based on the adjusted designated duration.

After completing the procedures of block 470, method 400 may end.

In other embodiments, part or all of the techniques of methods 300 and 400 may be combined. For example, usage rates may replace or supplement the use of network conditions described above with respect to method 300. In such embodiments, designated durations may be negotiated based on usage levels alone or using a combination of usage levels and network conditions. Similarly, network conditions may replace or supplement the use of usage levels described above with respect to method 400. In such embodiments, adjustments to designated durations may be made based on network conditions alone or using a combination of usage levels and network conditions. Many other combinations are possible as well.

Various exemplary embodiments have been described above. Those of ordinary skill in the art will appreciate, however, that numerous variations, changes, and modifications can be made to those examples while remaining within true scope and spirit of the invention as defined by the claims.

We claim:

1. A method, comprising: determining a condition of a radio frequency (RF) communication channel; an access terminal selecting a duration between a minimum duration and a maximum duration based, at least in part, on said determined condition, wherein selecting said duration comprises: (a) said access terminal receiving an indication of said condition from a base station, (b) selecting an initial duration based at least upon said indication of said condition received from said base station, (c) sending an indication of said initial duration to said base station, (d) receiving an indication of an adjusted duration, wherein said adjusted duration differs from said initial duration, and (e) selecting said adjusted duration as said duration; said access terminal selecting a time period for transmitting at least part of a communication in said RF communication channel, such that said time period has a duration greater than or equal to said selected duration; and said access terminal transmitting said at least part of said communication in said RF communication channel during said selected duration of said selected time period.

2. The method of claim 1, wherein transmitting said at least part of said communication comprises transmitting all of said communication in said RF communication channel during said selected duration of said selected time period.

3. The method of claim 1, further comprising:
selecting a transmission mode for said communication from among at least a first transmission mode and a second transmission mode.

4. The method of claim 3, wherein said first transmission mode is a high-capacity mode and said second transmission mode is a low-latency mode.

5. The method of claim 3, wherein selecting said duration based, at least in part, on said determined condition comprises:
selecting said duration based on said transmission mode and said determined condition.

6. The method of claim 1, wherein selecting said duration based, at least in part, on said condition comprises: said base station selecting said duration; said access terminal receiving an indication of said selected duration from said base station; and said access terminal selecting said duration based on said indication of said selected duration received from said base station.

7. The method of claim 1, wherein determining said condition comprises: said base station determining a reverse noise rise (RNR) in said RF communication channel.

8. The method of claim 1, wherein determining said condition comprises: said access terminal determining said condition based on at least one reverse activity bit (RAB) received from said base station.

9. The method of claim 1, wherein said time period is a frame, and said selected duration is an integral number of sub-frames of said frame.

10. A method, comprising:
determining a first usage level of a radio frequency (RF) communication channel;
selecting a designated duration based, at least in part, on said first usage level;
transmitting a first communication in said RF communication channel during a first time period, said first time period having a duration corresponding to said designated duration;
determining a second usage level of said RF communication channel;
adjusting said designated duration based, at least in part, on said second usage level, wherein said adjusting comprises: (i) comparing said second usage level to a threshold, (ii) if said second usage level is greater than said threshold, increasing said designated duration by an adjustment amount, and (iii) if said second usage level is less than said threshold, decreasing said designated duration by said adjustment amount; and
transmitting a second communication in said RF communication channel during a second time period, said second time period having a duration corresponding to said adjusted designated duration.

11. The method of claim 10, wherein said second usage level is determined a preset period of time after said first usage level is determined.

12. The method of claim 10, wherein said designated duration is an integral number of sub-frames and said adjustment amount is one sub-frame.

13. The method of claim 10, wherein adjusting said designated duration based, at least in part, on said second usage level comprises:
adjusting said designated duration between a minimum-duration limit and a maximum-duration limit.

14. A wireless device, comprising: a transceiver; a processor; and data storage, containing program instructions that can be executed by said processor to perform functions, said functions comprising: determining a condition of a radio frequency (RF) communication channel, selecting a duration between a minimum duration and a maximum duration based, at least in part, on said determined condition, wherein selecting said duration comprises: (a) receiving an indication of said condition from a base station, (b) selecting an initial duration based at least upon said indication of said condition received from said base station, (c) sending an indication of said initial duration to said base station, (d) receiving an indication of an adjusted duration, wherein said adjusted duration differs from said initial duration, and (e) selecting said adjusted duration as said duration, selecting a time period for transmitting at least part of a communication in said RF communication channel, such that said time period has a duration greater than or equal to said selected designated duration, and transmitting said at least part of said communication in said RF communication channel during said selected duration of said selected time period, via said transceiver.

15. The wireless device of claim 14, wherein said wireless device is an access terminal in communication with said base station.

16. The wireless device of claim 15, wherein said functions further comprise:
receiving an indication of said condition from said base station.

17. The wireless device of claim 15, wherein said functions further comprise:
receiving at least one reverse activity bit (RAB) from said base station; and
determining said condition based on said at least one RAB.

18. The wireless device of claim 14, wherein said functions further comprise:
selecting a transmission mode for said communication; and
selecting said designated duration based on said transmission mode and said condition.

19. The wireless device of claim 14, wherein said time period is a frame, and said selected duration is an integral number of sub-frames of said frame.

\* \* \* \* \*